US007133838B2

(12) United States Patent
Tokuma

(10) Patent No.: US 7,133,838 B2
(45) Date of Patent: Nov. 7, 2006

(54) PERSONAL INFORMATION BUYING/SELLING METHOD

(75) Inventor: Yasuyuki Tokuma, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 681 days.

(21) Appl. No.: 09/985,592

(22) Filed: Nov. 5, 2001

(65) Prior Publication Data

US 2002/0055884 A1 May 9, 2002

(30) Foreign Application Priority Data

Nov. 6, 2000 (JP) ............... 2000-337851

(51) Int. Cl.
*G06Q 30/00* (2006.01)
(52) U.S. Cl. ..................... 705/26
(58) Field of Classification Search ............. 705/26, 705/27
See application file for complete search history.

(56) References Cited

U.S. PATENT DOCUMENTS 5,987,440 A * 11/1999 O'Neil et al. ............... 705/44
6,182,050 B1 * 1/2001 Ballard ........................ 705/14
2002/0188563 A1 * 12/2002 Isaji et al. ................... 705/41
2003/0110076 A1 * 6/2003 Holt ............................ 705/14

FOREIGN PATENT DOCUMENTS

| JP | H10-207964 | 8/1998 |
| JP | 2002-042012 | 2/2002 |
| WO | WO 02/13090 A1 * | 2/2002 |

OTHER PUBLICATIONS

IBM TDB, "Intelligent Sales Server for e-Commerce", Feb. 20, 2002.*

* cited by examiner

*Primary Examiner*—Mark Fadok
*Assistant Examiner*—Naeem Haq
(74) *Attorney, Agent, or Firm*—Sughrue Mion, PLLC

(57) ABSTRACT

When an information seller registers personal information in an information manager, the information seller transmits the personal information from an information seller terminal 10 through a network 100 to an information manager terminal 20, and the information manager accumulates the personal information in a data base 26. When a personal information buyer purchases personal information from the information manager, the buyer transmits a personal information purchase request from an information buyer terminal 30 through the network 100 to the information manager terminal 20, and the information manager terminal 20 searches the data base to transmit the personal information corresponding to the request through the network 100 to the information buyer terminal 30.

11 Claims, 4 Drawing Sheets

FIG.3

| PERSONAL INFORMATION REGISTERING SCREEN | | | |
|---|---|---|---|
| (1) INFORMATION SUPPLY RANGE | ① LEVEL TO BE INFORMATION-REGISTERED | Z | |
| | ② USABLE/UNUSABLE CHECK FREQUENCY | ☐1, ALWAYS CHECK<br>☐2, CHECK FOR INFORMATION LEVEL ABOVE | |
| | ③ QUESTIONNAIRE SUPPORTABLE/ UNSUPPORTABLE | ☐1, SUPPORTABLE<br>☐2, UNSUPPORTABLE | |
| (2) INFORMATION REGISTRATION CONTENT | LEVEL 1(SPECIFICATION OF INDIVIDUAL) : ADDRESS, NAME, AGE, E-MAIL ADDRESS | | |
| | LEVEL 2(CURRENT ENVIRONMENT) : JOB, FAMILY MAKE-UP | | |
| | LEVEL 3(PAST PERSONAL HISTORY) :ALMA MATERS, HOMETOWN, WORKING HISTORY | | |
| | LEVEL 4(HABIT OF INDIVIDUAL) :SMOKING/ NON-SMOKING, EXERCISE FREQUENCY | | |
| | LEVEL 5(CHARACTER OF INDIVIDUAL) : HOBBIES, TASTES | | |
| | LEVEL 6(PROPERTY INFORMATION) : ANNUAL INCOME, PROPERTIES | | |
| (3) SETTLEMENT ACCOUNT | ○○BANK, ORDINARY DEPOSIT, ACCOUNT NUMBER ZZZZZZ | | |
| | | | TRANSMIT |

FIG.4

| INFORMATION SELECTING MENU SCREEN | |
|---|---|
| (1) OBJECT | OBJECT ; |
| (2) INVESTIGATION TARGETS | AREA ; |
| | AGE ; |
| | SEX ; |
| | OCCUPATION ; |
| | FREE ITEM ; |
| (3) INVESTIGATION REQUISITE ITEMS | LEVEL A ; OUTPUT NUMBER OF PERSONS SATISFYING CONDITION |
| | LEVEL B ; NUMBER OF PERSONS SATISFYING CONDITION AND COLLECT DATA OF PERSONAL INFORMATION OF PERSONS CONCERNED |
| | LEVEL C ; EXECUTION OF QUESTIONNAIRE TO PERSONS CONCERNED |

PERSONAL INFORMATION BUYING/SELLING METHOD

BACKGROUND OF THE INVENTION

1. Field of the Invention

The present invention relates to a personal information buying/selling method for buying/selling personal information by using a network such as the Internet or the like.

2. Description of the Related Art

Personal information such as the name, age, distinction of sex, address, family make-up, occupation, personal history and property of each individual is important information which are needed as marketing data or the like by many enterprises. Usually, such personal information is not targeted as buying/selling articles, and it is general to each enterprise that the personal information is created on the basis of various nominal lists or by accumulating client information needed by an individual enterprise.

However, since the method of buying/selling personal information has not been hitherto established, there are many cases that personal information of each individual is stolen from him/her without individual's knowledge or it is used without individual's permission, resulting in occurrence of social problems.

SUMMARY OF THE INVENTION

The present invention has an object to provide a personal information buying/selling method with which personal information can be sold/bought efficiently and legally.

In order to attain the above object, a method of buying/selling personal information through a network according to the present invention, which comprises: transmitting a personal information to be registered from a seller terminal through the network to an information manager terminal by a personal information seller and accumulating the personal information thus transmitted into a data base by an information manager, in case that the personal information seller registers the personal information in the information manager; and transmitting a purchase request for a personal information from a buyer terminal through the network to the information manager terminal by a personal information buyer and searching the data base to transmit the information corresponding to the request from the information manager terminal through the network to the buyer terminal by the information manager, in case that the personal information buyer purchases the personal information from the information manager.

Furthermore, a method of buying/selling personal information through a network according to the present invention, which comprises: selecting an information level to be registered from predetermined information levels and transmitting a personal information corresponding to the information level thus selected from a personal information seller terminal through the network to an information manager terminal by a personal information seller, and accumulating the personal information thus transmitted into a data base by an information manager, in case that the personal information seller registers the personal information in the information manager; and transmitting a purchase request for a personal information from a buyer terminal through the network to the information manager terminal by a personal information buyer and searching the data base to transmit the information corresponding to the request from the information manager terminal through the network to the buyer terminal by the information manager, in case that the personal information buyer purchases the personal information from the information manager.

Still furthermore, a method of buying/selling personal information through a network according to the present invention, which comprises: transmitting a personal information to be registered from a seller terminal through the network to an information manager terminal by a personal information seller and accumulating the personal information thus transmitted into a data base by an information manager, in case that the personal information seller registers the personal information in the information manager,; and transmitting a purchase request for a personal information from a buyer terminal through the network to the information manager terminal by a personal information buyer, and searching the data base to extract sellers of the personal information corresponding to the request, transmitting the information of the personal information buyer to all the sellers of the personal information thus extracted to check whether the information can be supplied or not and searching the information corresponding to the request from only the personal information of sellers who agree with the information supply to transmit the information to the buyer terminal through the network by the information manager, in case that the personal information buyer purchases the personal information from the information manager.

The personal information means all the information owned by each individual. For example, it contains the name, the age, the distinction of sex, the address, the telephone number, the electronic mail address, the family make-up, the occupation, the personal history, the owed property, the hobbies, tastes and personality. Information buyers register the information such as their profiles in the information manager terminal in advance to adopt a membership system. Further, information sellers may be registered to adopt a membership system, or registration of personal information may be accepted from many and unspecified sellers without establishing the membership system. When personal information is transmitted/received through a network from an information manager terminal, an information buying terminal or the like, the personal information is subjected to scrambling processing to keep security.

According to the present invention, any personal information buyer can efficiently and legally get desired personal information by buying/selling personal information through a network. Further, when a personal information seller registers personal information, the seller can select a desired information level from predetermined information levels, so that the seller can register only personal information which can be supplied to a third party. Further, information on a personal information buyer is transmitted to a personal information seller to check whether it is allowed to supply the personal information of the personal information seller to the personal information buyer, so that the personal information seller can supply personal information without anxiety.

BRIEF DESCRIPTION OF THE DRAWINGS

FIG. 3 is a diagram showing an example of a personal information registering screen; and FIG. 4 is a diagram showing an example of an information selecting-menu screen.

DETAILED DESCRIPTION OF THE PREFERRED EMBODIMENTS

Preferred embodiments according to the present invention will be described hereunder with reference to the accompanying drawings.

Figure 1:
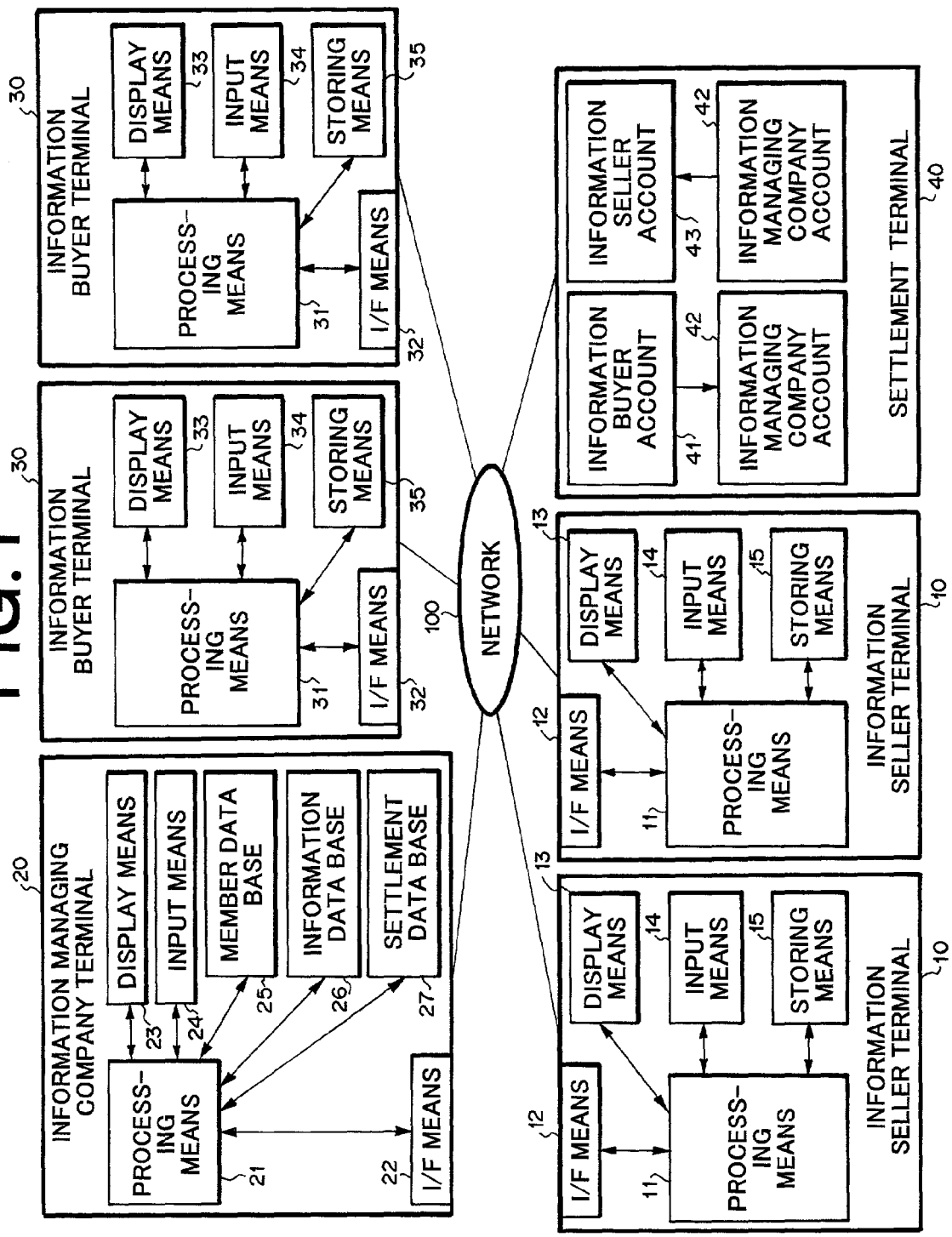
FIG. 1 is a diagram showing the construction of an embodiment of a buying/selling system according to a personal information buying/selling method of the present invention.

FIG. 1 is a block diagram showing the construction of an embodiment of a buying/selling system according to a personal information buying/selling method of the present invention. In FIG. 1, information seller terminal 10 is an information terminal used when a personal information seller registers personal information.

The information seller terminal 10 is constructed by an information processor such as a personal compute or the like. Plural information seller terminals 10 are connected to network 100 such as the Internet or the like. A personal information seller may be registered in an information managing company to adopt a membership system in advance as described above, or many and unspecified persons may be personal information supplier who supply their personal information without adopting membership system.

The information seller terminal 10 comprises processing means 11 for carrying out various data processing, I/F (interface) means 12 having a function of transmitting/receiving data to/from the network 100, display means 13 for displaying various guide screens, input means 14 having a data input function and storing means 15 for storing data.

When personal information is registered, the information seller terminal 10 accesses information managing company terminal 20 on the network 100 to request personal information-input screen information. Thereafter, it displays a personal information-input screen transmitted from the information managing company terminal 20 on the display means 13 to input personal information along the display screen through the input means 14, and transmits the personal information to be registered through the network 100 to the information managing company terminal 20. When there is a personal information seller for personal information, confirmation request information as to whether it is possible to supply information is received from the information managing company terminal 20, and transmits information supply allowing/rejecting information through the network 100 to the information managing company terminal 20.

The information managing company terminal 20 is used by an enterpriser who registers/sells personal information on business, and it is constructed by an information processor such as a workstation server or the like. Likewise, the information managing company terminal 20 is connected to the network 100. The information managing company terminal 20 comprises processing means 21 for performing various data processing, I/F means 22 having a function of transmitting/receiving data to/from the network 100, display means 23 for displaying various guide screens and input means 24 having a data input function. Further, the information managing company terminal 20 comprises member data base 25, information data base 26 and settlement data base 27.

Each of information buyers holds a membership, and member information such as the name (appellation), the address, the summary of business contents (member profile) and the membership number of each member is accumulated in the member data base 25. Further, the personal information registered by a seller is accumulated in the information data base 26, and settlement information such as charges to be paid due to buying/selling of personal information, transfer account, etc. is accumulated in the settlement data base 27.

The information managing company terminal 20 transmits personal information registering screen information through the network 100 to the information seller terminal 10 in accordance with a request from the information seller terminal 10, receives personal information from the information seller terminal 10 and then accumulates the personal information into the information data base 26. Further, the information managing company terminal 20 transmits information selecting-menu screen information through the network 100 to the information buyer terminal 30 in accordance with a request from the information buyer terminal 30, and creates and transmits the information corresponding to the request in response to the request from the information buyer terminal 30. Further, the information managing company terminal 20 transmits the settlement content on the buying/selling of information to settlement terminal 40.

The information buyer terminal 30 is used by a member serving as a buyer, and it is constructed by an information processor such as a personal computer or the like. Plural information buyer terminals 30 are connected to the network 100. The information buyer terminal 30 comprises processing means 31 for performing various data processing, I/F means 32 having a function of transmitting/receiving data to/from the network 100, display means 33 for displaying various guide screens, input means 34 having a data input function and storing means 35 for storing data.

The information buyer terminal 30 accesses the information managing company terminal 20 on the network 100, and requests information selecting-menu screen information. Further, the information buyer terminal 30 receives the information selecting-menu screen information from the information managing company terminal 20 and requests a condition for needed personal information to the information managing company terminal 20 according to the selecting menu screen. Further, the information buyer terminal 30 receives the information corresponding to the request transmitted from the information managing company terminal 20.

The settlement terminal 40 is a terminal for settling an account on the buying/selling of personal information, and it is installed in a financial institution such as a bank or the like. The settlement terminal 40 has information buyer account 41, information managing company account 42 and information seller account 43. The settlement terminal 40 receives settlement information from the information managing company terminal 20 after information is supplied, withdraws an information purchase charge (money) on the basis of the settlement information and transfers it from the information buyer account 41 to the information managing company account 42 on due date. Further, the settlement terminal 40 withdraws an information supply charge (money) on the basis of the settlement information from the information managing company terminal 20 and transfers it from the information managing company account 42 to the information seller account 43.

Next, the personal information buying/selling method of this embodiment will be described.

Figure 2:
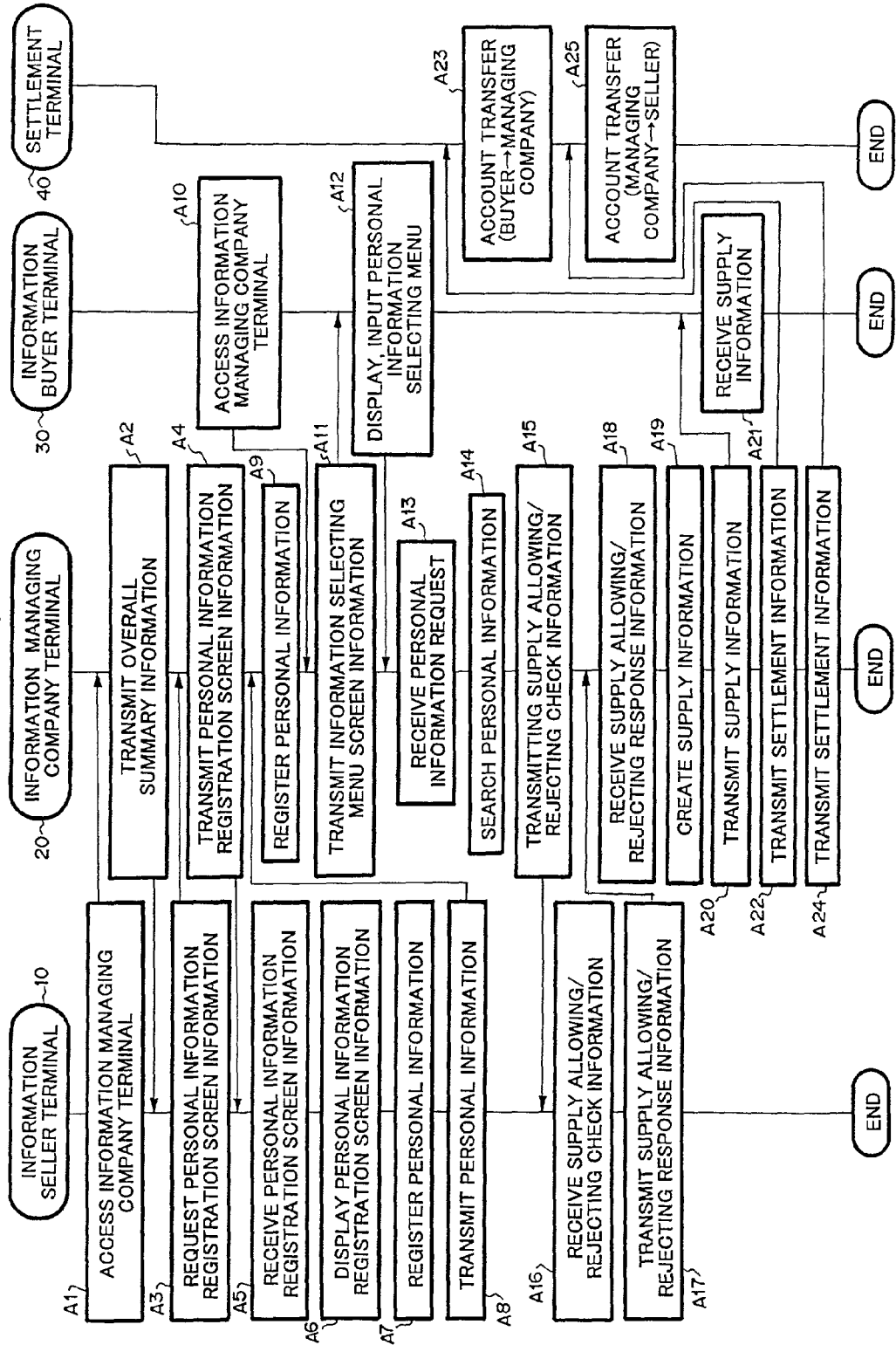
FIG. 2 is a flowchart showing an embodiment of a personal information buying/selling method according to the present invention.

FIG. 2 is a flowchart showing a personal information buying/selling method according to an embodiment of the present invention. In the following description, the network 100 is the Internet, and the information seller terminal 10, the information managing company terminal 20, the information buyer terminal 30 and the settlement terminal 40 are connected to one another through the Internet.

First, the method of registering personal information into an information managing company by an information seller will be described.

In FIG. 2, when personal information is registered, the information seller accesses the information managing company terminal 20 from the information seller terminal 10 through the network 100 (step A1).

In response to this access, the information managing company terminal 20 transmits an overall summary information on this business (that is, personal information buying/selling) to the information seller terminal 10 (step A2). Here, the overall summary information contains the detailed information on the overall construction of this business and matters to be attended to (or contract contents on personal information buying/selling). In this case, a contact on the personal information buying/selling may be made between the information managing company and the personal information seller, or a contract may be made by exchanging written contracts mutually. For example, it may be considered as a contract content that information is not illegally used, an information registrant can check whether information is usable when the information is used, a consideration is paid when information is sold.

The information seller checks the content, and requests to the information managing company terminal 20 personal information registration-screen information needed to register personal information when the he/she agrees with the content (step A3). When a membership system is established between personal information sellers, the processing of the step A2 is unnecessary, and this processing is carried out when member registration is carried out.

The information managing company terminal 20 transmits the registration-screen information to the information seller terminal 10 serving as the requester in response to the request of the personal information registration-screen information (step A4). When the information seller terminal 10 serving as the requester receives the personal information registration-screen information (step A5), it displays the personal information registration screen based on the personal information registration-screen information on the display means 13 (step A6), and the personal information seller registers the personal information according to the personal information registration screen (step A7).

FIG. 3 shows an example of the personal information registration screen.

The personal information registration screen comprises: information supply range (1); information registration content (2); and settlement account (3). The information supply range (1) is divided into item (A) for a level to be information-registered, item (B) for a usable/unusable check frequency and questionnaire supportable/unsupportable item (C). Here, information to be registered is sectioned into plural information levels as shown in the information registration content (2), and the level to be information-registered (A) is a level to be registered out of the plural information levels. For example, only the information of the level 1 and the level 2 may be registered, or all the level information may be registered. Further, in this embodiment, the information managing company carries out a questionnaire investigation on behalf of a information buyer, and the questionnaire supportable/unsupportable item (C) indicates whether the questionnaire investigation is possible or not.

When personal information is supplied to a personal information buyer as described later, the usable/unusable check frequency item (B) makes a seller check whether the personal information of the seller can be supplied or not, and thus it corresponds to the level of information that the check of the supply is needed. "always check" means that all the information levels registered are needed to be checked, and "check for information level above_" means the information level for which it is needed to check whether the information supply is possible or not. For example, if "check for information level above 3" is registered, it is unnecessary to check for the information levels 1, 2 whether the information supply is possible or not, and it is necessary to check for the information level 3 whether the information supply is possible or not. As described above, the personal information seller can check it in accordance with the information level whether the personal information can be supplied or not.

The information registration content (2) is the content of personal information to be registered, and it is divided into plural levels so that the personal information seller can select personal information to be registered. In the case of FIG. 3, it is divided into the level 1 to the level 6, and personal information is determined every level. For example, the level 1 is the information specifying each individual, and it contains the address, name, age and E-mail address of each individual. The level 5 is the information indicating character of each individual, and it contains hobbies and tastes. The level 6 is the property information and it contains the annual income and the properties of each individual. The personal information is not limited to that shown in FIG. 3, and various other personal information may be used.

The settlement account (3) contains the name of a financial institution and the account thereof of each personal information seller. This is needed when the information manager pays an information purchase charge to each personal information seller. The information purchase charge is paid in accordance with the level of the personal information when personal information registered as described later is supplied to a seller.

When the information seller registers the personal information, the seller inputs the respective items of the personal information by operating the input means 14. At this time, with respect to the information registration content, the content of the information level to be registered out of the information levels 1 to 6 is input by operating the input means 14 (step A7). For example, if the registration is carried out for the information levels 1 and 2, the information such as the address, the name, the age, the job and the family make-up are input. Finally, a transmission button on the screen of FIG. 3 is clicked to transmit the personal information to be registered to the information managing company terminal 20 (step A8).

When receiving the personal information, the information managing company terminal 20 registers the personal information into the information data base 26, and registers the settlement information into the settlement data base 27 (step A9). The information data base 26 has a mechanism of carrying out various processing on information in accordance with various requests and outputting the processing results. As described above, the information managing company terminal 20 accepts the registration of the personal information from the information seller terminal 10 through the network 100, and accumulates the registration contents into the information data base 26.

Next, a method of purchasing personal information by a member serving as an information buyer will be described.

First, when an information buyer purchases personal information from the personal information managing company terminal 20, the information buyer accesses the information managing company terminal 20 from the information buyer terminal 30 through the network 100 (step A10). In response to this access, the information managing company terminal 20 transmits to the information buyer terminal 30 the information selecting-menu screen information needed when the personal information is sold (step A11). When the receiving the information selecting-menu screen information, the information buyer terminal 30 displays the information selecting-menu screen based on the information selecting-menu screen information on the display means 33 (step A12).

FIG. 4 shows an example of the information selecting-menu screen. As shown in FIG. 4, the information selecting-menu screen contains object (1), investigation targets (2) and investigation requisite items (3). The object (1) is a using object of personal information of a seller. The investigation targets (2) are classified into the area (for example, the metropolis and districts, cities, towns and villages, and wards), the age, the distinction of sex, the occupation. A free item is an item other than these investigation targets. For example, hobbies, a property status or the like can be freely set as an investigation target.

The investigation requisite item (3) is classified into the level A to the level C, and the personal information buyer selects a desired level from these levels. The level A means output of the number of persons who satisfy an investigation condition. This is used to request to supply only the number of persons corresponding to the investigation condition. The level B means supply of the number of persons corresponding to the investigation condition and the registered personal information of the persons concerned.

The level C means the execution of a questionnaire to the persons concerned on buyer's behalf. As described with reference to FIG. 3, the information managing company executes a questionnaire investigation on buyer's behalf in accordance with a buyer's request, so that the questionnaire investigation is carried out on persons who satisfy an investigation condition, and the investigation results are collected and supplied to the buyer.

Here, when a buyer requests an investigation of personal information under the condition that the object is "calculation of the market scale of new automobiles" and the investigation item is "investigation of the number of married men having a taste for driving", the information such as the area, the age, the distinction of sex and free items (tastes) to be targeted may be input as an investigation condition. On the basis of the family make-up, it is found whether a person is married or not. Further, for example when a buyer requests an investigation under the condition that the object is "take possession of house selling target information" and the investigation item is "where to make contact with a householder who has an annual income of ten million yen or more and live in Minato-ku of Tokyo", the information such as the area and the annual income to be targeted may be likewise input as an investigation condition.

Further, when an investigation is requested under the condition that the object is "searching targets for beer drinking trial campaign of beer" and the investigation item is "take possession of E-mail addresses of women of thirties living in Kanagawa prefecture", the information such as the area (in this case, Kanagawa prefecture), the age (thirties) to be targeted may be input as an investigation condition. The buyer may request supply of personal information for various other purposes.

When the information selecting-menu screen is displayed on the display means 33 of the information buyer terminal 30, the information buyer inputs an investigation condition for desired personal information, etc. by operating the input means 34 according to the menu screen (step A12). For example, in order to take possession of the house selling target information, when the buyer investigates where to make contact with a householder who has an annual income of ten million yen or more and live in Minato-ku of Tokyo, the buyer inputs the area (Minato-ku, Tokyo) and the annual income (ten millions yen or more) as the object and the investigation target. Further, the buyer inputs the level B as the investigation requisite item. When the input of the requisite item is completed, the information buyer clicks the transmission button on the screen of FIG. 4 to transmit the input information to the information managing company terminal 20 (step A13).

When receiving the request content from the information buyer terminal 30, the information managing company terminal 20 searches the information data base 26 to extract sellers (information suppliers) of the personal information corresponding to the requested condition (step A14). For example, when "where to make contact with a householder who has an annual income of ten million yen or more and live in Minato-ku of Tokyo" is requested to take possession of the house selling target information as described above, the information data base 26 is searched to extract information suppliers concerned. In this case, it is assumed that plural information suppliers satisfying this request are extracted.

Subsequently, the information managing company terminal 20 creates a list of the information suppliers (information sellers) of the personal information thus extracted by searching the member data base 27 (step A14). Further, the information managing company terminal 20 transmits the profiles, using objects and necessary information levels of the members (the information sellers) as information supply allowing/rejecting check information to all the information seller terminals 10 of the list of the information suppliers thus searched (step A15). The profiles of the members are registered in the member data base 25 when they are registered as members in the information managing company.

In this case, the using object is "take possession of the house selling target information", and "address" and "annual income" are satisfied as the necessary information level. The level 1 and the level 6 of FIG. 3 are transmitted as the necessary information levels to each information seller terminal 10.

Further, in a case where the number of married men having a taste for driving is investigated in order to calculate the target market of a new automobile, "taste" and "distinction of sex" are satisfied as the necessary information level, and the level 1 and the level 5 are transmitted.

Still further, in a case where the E-mail addresses of women of thirties living in Kanagawa prefecture is investigated in order to find targets for the beer drinking trial campaign, "address", "distinction of sex" and "age" are satisfied as the necessary information level, and the level 1 of FIG. 3 is transmitted. In this case, since the information level for which the check is needed is registered as the usable/unusable check frequency when personal information is registered as described with reference to FIG. 3, it may be determined in accordance with the registered information level every seller whether the check is carried out or not.

When the information seller terminal 10 receives the information supply allowing/rejecting check information (step A16), the information supplier serving as the personal information seller checks the content of the information supply allowing/rejecting check information, and transmits a supply allowing/rejecting response indicating whether the supply of the personal information is allowed or rejected (step S17). The information managing company terminal 20 receives the information supply allowing/rejecting response from the information seller terminals 10 serving as the responding targets as described above (step A18), extracts only the personal information of information suppliers allowing the information supply from the information data base 26 to create the personal information to be supplied to the buyer (step A19), and then transmits the personal information thus created to the information buyer terminal 30 serving as the requester (step A20). The personal information thus transmitted is received at the information buyer terminal 30 serving as the requester (step A21), and used as marketing data or the like by the member serving as the information buyer. When there is no response from the information seller, the personal information is not supplied.

Subsequently, the information managing company terminal 20 transmits settlement information such as an information supply charge and a payment due date through the network 100 to the settlement terminal 40 in order to receive a payment of the information supply charge from the information buyer (step A22). When receiving the settlement information, the settlement terminal 40 transfers the information supply charge from the information buyer account 41 to the information managing company account 42 on the payment due date on the basis of the settlement information (step A23).

The information managing company terminal 20 transmits settlement information such as an information purchase charge and a payment due date to the settlement terminal 40 in order to pay the information purchase charge to all the information sellers associated with the present information supply (step A24). When receiving the settlement information, the settlement terminal 40 transfers the information purchase charge from the information managing company account 42 to the information seller account 43 on the payment due date on the basis of the settlement information (step A24). The payment is carried out to all the information suppliers in accordance with the information levels of the supplied information. The reception of the information supply charge may be carried out every information buying/selling action as described above, however, an entrance fee, a membership fee or the like may be assigned as the information supply charge.

In the above embodiment, the personal information of the present invention is not limited to that of FIG. 3, and personal information such as all the licenses such as a driving license and a licensed tax accountant, and personal information such as official positions of companies and organizations may be added to the personal information of FIG. 3 as targets for buying/selling.

As described above, according to the present invention, by buying/selling personal information through the network, the personal information buyer can efficiently and legally take possession of desired personal information. Further, when the personal information seller registers the personal information, the seller can select a desired information level from the predetermined information levels, so that only the personal information which can be supplied to a third party can be registered. Still further, since the information of the personal information buyer is transmitted to the personal information seller to check whether the personal information can be supplied or not, the personal information seller can supply the personal information without anxiety.

What is claimed is

1. A method of buying and selling personal information through a network, comprising:
    transmitting a personal information to be registered from a seller terminal through said network to an information manager terminal;
    accumulating the personal information thus transmitted into a data base of said information manager terminal;
    transmitting a personal information purchase request from a buyer terminal through said network to said information manager terminal, when said buyer terminal purchases the personal information from said information manager terminal;
    searching the data base to extract seller terminals which are connected with information corresponding to the personal information purchase request;
    transmitting the information on a buyer of said buyer terminal to the seller terminals thus extracted to check whether the personal information can be supplied or not; and
    searching the personal information of the seller terminals who agree to transmit the personal information to said buyer terminal through said network by said information manager terminal,
    wherein said information manager transmits settlement information on the personal information buying/selling through said network to a settlement terminal, receives an information supply charge from said personal information buyer on the basis of the settlement information at said settlement terminal and pays an information purchase charge to said personal information seller,
    wherein the information purchase charge is paid in accordance with a personal information level to be supplied.

2. The method as claimed in claim 1, wherein said personal information buyer is registered as one of members in said information manager in advance, and personal information is sold to only the members.

3. The method as claimed in claim 1, wherein when a personal information registration request is transmitted from said personal information seller, a personal information-input screen information used to input personal information is transmitted to said seller terminal by said information manager.

4. The method as claimed in claim 1, wherein when a personal information purchase request is transmitted from said personal information buyer, a personal information selecting-menu screen information to select personal information is transmitted to said buyer terminal by said information manager.

5. The method as claimed in claim 1, wherein when a personal information registration request is transmitted from said personal information seller, said information manager transmits information indicating the overall summary of the personal information buying/selling to a seller terminal, and accepts registration of the personal information when said personal information seller agrees with the content of the information thus transmitted.

6. The method as claimed in claim 1, wherein in response to a request from said personal information buyer, said information manager carries out a questionnaire investigation to said personal information seller on buyer's behalf.

7. The method as claimed in claim 1, wherein said personal information buyer transmits a using object and an investigation item to said information manager terminal when a personal information purchase request is transmitted.

8. The method as claimed in claim 1, wherein said personal information seller registers whether said seller accepts a questionnaire investigation when personal information is registered.

9. The method as claimed in claim 1, wherein said personal information seller registers a check-needed information level for information levels registered when personal information is registered.

10. The method as claimed in claim 1, wherein said personal information seller registers a settlement account when personal information is registered.

11. The method as claimed in claim 1, wherein said settlement terminal contains an information seller account, an information manager account and an information buyer account, and said information manager transfers the information supply charge from said information buyer account to said information manager account and transfers the information purchase charge from said information manager account to said information seller account.

* * * * *